Patented Oct. 12, 1943

2,331,328

UNITED STATES PATENT OFFICE 2,331,328

PLASTIC COMPOSITION

Lucas P. Kyrides, Webster Groves, Mo., assignor to Monsanto Chemical Company, St. Louis, Mo., a corporation of Delaware No Drawing. Application June 26, 1940, Serial No. 342,443

12 Claims. (Cl. 260—36)

The present invention relates to plastic compositions of matter which contain plastic substances embodying a plurality of C—O—C linkages and refers particularly to a new class of softening or plasticizing compositions for use as camphor substitutes for such plastic compositions, specifically to esters of hydroxycyclohexanones. The invention relates also to a new method of preparing esters of hydroxycyclohexanones and certain new compounds of this series.

The principal object of the invention is to provide improved softening or plasticizing compounds for use in plastic compositions embodying a plurality of C—O—C linkages, particularly cellulose derivatives, for example, cellulose esters and ethers such as cellulose acetate, cellulose nitrate and ethyl cellulose, and polyvinyl acetal resins. Another object of the invention is to provide a method of preparing such plasticizing compounds. These and other objects of the invention, some of which are referred to specifically hereinafter, will be apparent from this description.

My invention is based on the discovery that esters of hydroxycyclohexanones are compatible to a remarkable extent with polyvinyl acetal resins and cellulose derivatives such as cellulose acetate and cellulose nitrate and that the plastic compositions resulting from such admixture are characterized by excellent stability to light, good flexibility, high tensile strength and fair elongation. I have also discovered a new method of preparing esters of hydroxycyclohexanones which makes it possible to produce such compounds in an economical manner and in high yield.

The acetate of 2-hydroxycyclohexanone of the formula

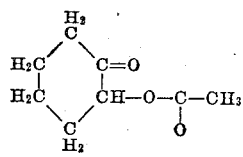

is an example of an ester of a hydroxycyclohexanone that is suitable for use according to my invention. This compound was first described by Bergmann and Gurth, in Annalen, 1926, vol. 448, page 71, as melting at 41° to 42° C. and boiling at 118° at 12 mm. The compound has also been named 2-acetoxycyclohexane-1-one and could be named, according to various systems of nomenclature, as 1,2-cyclohexanolone acetate, acetate of adipoin, or simply o-cyclohexanonyl acetate, none of which names is sufficiently suggestive, however, of a compound corresponding to a keto-cyclohexanol ester in which the carbinol group has been esterified by an acid. Throughout this specification, therefore, the compounds will be referred to as esters of a hydroxycyclohexanone and it is to be understood that the carboxyl group has been substituted in the cyclohexanone in a manner corresponding to esterification of the hydroxyl group of the hydroxycyclohexanone by an acid, although this is not actually the method by which I prefer to produce the compounds.

The benzoate of 2-hydroxycyclohexanone is also known and was described by Kötz et al., in Annalen, 1913, vol. 400, page 63, by Bergmann and Gurth, in Annalen 1926, vol 448, page 72 and by Wilson and Read in Journal of the Chemical Society (London), 1935, page 1273, although its melting point was given as 122° to 123° C., 87° C., and 85° to 86° C., by the respective investigators.

The esters for use in my invention may be hydroxycyclohexanone esters of simple monocarboxylic aliphatic acids such as formic, acetic, propionic, butyric, valeric (pentanoic), caproic (hexanoic), heptanoic, octanoic and the like, including isomers and higher homologues thereof, monocarboxylic aromatic acids such as benzoic, toluic, and the like, their homologues and isomers, as well as esters of polycarboxylic acids containing one free unesterified carboxyl group such as monoethylphthalic, monomethylphthalic, monobutylphthalic and monoethylsuccinic acids and esters of polycarboxylic acids containing one free unesterified carboxyl group in which the other carboxyl groups have been esterified by keto-alcohols or ether alcohols, for example, monoacetonyl phthalic acid or the monophthalyl ester of the monoethyl ether of ethylene glycol. The esters may also be derived from monocarboxylic ether acids and esterified polycarboxylic ether acids containing one unesterified carboxyl group such as ethoxyacetic acid ($C_2H_5OCH_2COOH$)

monoethyldiglycolic acid ($C_2H_5OOC \cdot CH_2 \cdot O \cdot CH_2 \cdot COOH$)

and the like. In general, any acid corresponding to a carboxyl-substituted hydrocarbon or ether which may have as optional substituents, chlorine, hydrocarbon radicals or carboxyl radicals esterified by alcohols, ether alcohols or keto-alcohols, may be used. One or more such acid radicals may be substituted in the cyclohexanone nucleus. The hydroxycyclohexanone from which the compounds can be considered to be derived may be 2-hydroxycyclohexanone, 3-hydroxycyclohexanone, 4-hydroxycyclohexanone, polyhydroxycyclohexanones and homologues thereof, although, because of ease of preparation, the monoesters of 2-hydroxycyclohexanone are preferred. In general, the esters of hydroxycyclohexanones for use according to this invention are cyclohexanones in which a hydrogen atom of one or more of the methylene groups is substituted by the radical —OOC—X, in which X corresponds to hydrogen (—H), a hydrocarbon (—R), chlorinated hydrocarbon (—RCl), alkoxy-substituted hydrocarbon (—ROR), esterified carboxyl-substituted hydrocarbon (—R—COOR) or esterified carboxyl and alkoxy-substituted hydrocarbon (—R—O—R—COOR) radicals. Monoesters of 2-hydroxycyclohexanone are preferred compounds and examples of such compounds are the acetate, butyrate, hexanoate, monoethyldiglycolate, monoethylthiodiglycolate, ethoxyacetate and monoethylphthalate of 2-hydroxycyclohexanone.

General methods of preparing esters of hydroxycyclohexanones have been heretofore described. The acetate of 2-hydroxycyclohexanone was prepared heretofore by reacting 2-hydroxycyclohexanone with acetic anhydride, using pyridine as a solvent and by reacting 2-bromocyclohexanone with silver acetate. The benzoate of 2-hydroxycyclohexanone was prepared heretofore by esterifying 2-hydroxycyclohexanone with benzoyl chloride in pyridine in the presence of a trace of acetic acid as a catalyst, in one case, and in the absence of acetic acid in another; and, according to another method, by oxidizing monobenzoyl cyclohexane-1,2-diol with potassium dichromate and sulfuric acid. None of these general methods are commercially feasible for the preparation of compounds which are to be used as camphor substitutes or to replace other plasticizers because the costs of the products made according to such methods are too high.

The foregoing heretofore known methods involve either the initial preparation of 2-hydroxycyclohexanone, which is not simple; the use of acid chlorides, which are expensive; the use of silver bromide, which is expensive and will be partially lost and unrecovered; or the use of oxidizing procedures which require a high degree of control to produce good yields. Because of these, and for other obvious reasons militating against the use of these general methods for the production of the compounds, I had considered using the reaction of chlorocyclohexanone or bromocyclohexanone with sodium acetate. The reaction of 2-chlorocyclohexanone and 2-bromocyclohexanone with sodium acetate in glacial acetic acid was heretofore described, however, but the only product which is formed is cyclohexenone, according to Kötz and Grethe, in Journal für praktische Chemie, 1909, vol. 80 (New Series), pages 491 and 493 (see also Beilstein, "Handbuch der organischen Chemie," Berlin, 1932, vol. VII, pages 10 and 51).

After unsuccessful attempts to find other methods of making esters of hydroxycyclohexanones, in a commercially feasible manner, I tried the reaction of 2-chlorocyclohexanone with anhydrous sodium acetate in glacial acetic acid, and found, contrary to expectations based on the reports of others, that the reaction yielded the acetate of hydroxycyclohexanone in good yield. This general reaction is the basis of my preferred method of making acid esters of hydroxycyclohexanones and is illustrated in the examples which follow:

Example I.—*Acetate of 2-hydroxycyclohexanone*

The starting material for this synthesis is 2-chlorocyclohexanone which can be prepared by the direct chlorination of cyclohexanone. The chlorination may be conducted in a diluent such as benzene and is preferably conducted in the presence of marble or a similar material which will absorb or neutralize the hydrogen chloride formed in the reaction. To restrict the chlorination to a monochlorinated derivative, the cyclohexanone is underchlorinated, that is, the chlorination is conducted to an extent corresponding to the conversion of about 33% but less than about 100% and preferably not more than 67% to the monochlorinated cyclohexanone. From such a reaction mixture the chlorocyclohexanone, having a boiling point of approximately 105° to 108° C. at a pressure of 26 mm., can be separated by fractional distillation.

A mixture of 85 grams of anhydrous sodium acetate (about 1.04 mol) suspended in 70 grams of glacial acetic acid (about 1.17 mol) is placed in a flask provided with a stirrer and reflux condenser. The mixture is heated to about 100° C. and 125 grams of 2-chloro-cyclohexanone (about 0.94 mol) is added thereto in small portions by means of a dropping funnel while a gentle reflux is maintained. The heating is continued at such a temperature as to maintain the gentle reflux for about 12 hours. The reaction mixture is then cooled and diluted with sufficient water to dissolve the salts. Benzene is then added to take up the organic substances and thereafter the aqueous and benzene layers are separated. The benzene layer is washed with water and then with dilute sodium carbonate solution and finally with water until the washings are approximately neutral. The benzene solution is then fractionated, the product being recovered in vacuum. The acetate of 2-hydroxycyclohexanone has a boiling point of about 108° to 110° C. at a pressure of 10 mm., a boiling point of about 112° C. at 12 mm., and about 235° C. at atmospheric pressure. Its melting point is 40° to 42° C. The yield was 102 grams of ester, which is approximately 69% of the theoretical yield based on the 2-chlorocyclohexanone used in the reaction.

Instead of using pure 2-chlorocyclohexanone in the foregoing preparation, an underchlorinated cyclohexanone reaction mixture from which reacted and unreacted marble or other hydrogen-chloride-absorbent has been removed, may be used.

Example II.—*Butyrate of 2-hydroxycyclohexanone*

Into a three-necked flask, provided with a reflux condenser, stirrer and dropping funnel, is placed 148 grams of 99% butyric acid (about 1.66 mol). Sodium hydroxide pellets are then added slowly while the mixture is agitated, until 30.5 grams of sodium hydroxide has been added. The mixture is then heated while stirring until all the sodium hydroxide (about 0.76 mol) is dissolved and the water formed in the reaction is then distilled off in partial vacuum, so as to leave anhydrous sodium butyrate and butyric acid in the flask.

To the anhydrous sodium butyrate-butyric acid mixture (about 0.76 mol sodium butyrate and 0.89 mol butyric acid) thus obtained is then added slowly, through the dropping funnel, 84 grams of 2-chlorocyclohexanone (about 0.63 mol) while maintaining a reaction temperature of about 150° C. The reaction mixture is then maintained at a gentle reflux, the temperature being about 145° to 150° C., for a period of about 10 hours.

The product is recovered as in Example 1. The benzene layer may be dried with calcium chloride, sodium sulfate or other drying agent, if desired, prior to distillation. The butyrate of 2-hydroxycyclohexanone has a boiling point of about 125° to 130° C. at a pressure of 8 mm. and a boiling point of about 260° C. at atmospheric pressure. The yield was approximately 101 grams, which is 86.5% of the theoretical yield from the 2-chlorocyclohexanone used.

EXAMPLE III.—*n-Hexanoate of 2-hydroxycyclohexanone*

The hexanoic acid ester of 2-hydroxycyclohexanone is prepared by substituting 116 grams of n-hexanoic acid (about 1 mol) for the butyric acid, 20 grams of sodium hydroxide pellets (about 0.5 mol) for the 30.5 grams of such pellets, and 66 grams of 2-chlorocyclohexanone (about 0.5 mol) for the 84 grams of this compound in Example II, and the procedure therein described is followed. The refluxing temperature is about 155° C. and refluxing is continued for about 4½ hours instead of 10 hours.

The n-hexanoate of 2-hydroxycyclohexanone has a boiling point of 140° to 148° C. at a pressure of 7 mm. and a boiling point of 285° to 287° C. at atmospheric pressure and is obtained in a yield of about 91 grams, which is 86% of the theoretical yield based on the 2-chlorocyclohexanone used.

EXAMPLE IV.—*Ethylphthalyl ester of 2-hydroxycyclohexanone*

Into a flask provided with a stirrer, a reflux condenser, and a dropping tube, is charged 88.8 grams of phthalic anhydride (about 0.6 mol) and 142 grams of anhydrous ethyl alcohol (about 3.1 mols). The mixture is heated to reflux temperature (about 81° C.) while stirring, and is refluxed gently for about one-half hour at this temperature. The mixture containing monoethylphthalic acid is then allowed to cool to about 75° C., and 41.7 grams of anhydrous (99.5%) potassium carbonate (about 0.30 mol) is added slowly with stirring over the course of one-half hour while the temperature is maintained at 65° to 75° C. The mixture is thereafter heated at a gentle refluxing temperature for an additional one-half hour. The resulting solution of potassium monoethylphthalate is not entirely clear. To this solution is then added 66.5 grams of 2-chlorocyclohexanone (about 0.5 mol) in small portions (about 10 minutes being required for the addition). After this addition the mixture is refluxed for about 25 hours.

From the reaction mixture the monoethylphthalyl ester of 2-hydroxycyclohexanone may be recovered as follows: The excess alcohol is removed by evaporation in vacuum to a maximum temperature of 130° C. or thereabout at a pressure of 20 mm. The mixture is then cooled and washed with 250 cc. of warm water (60° to 70° C.) and is thereafter stirred into 250 cc. of water containing about 15 grams of sodium carbonate or more, if required to maintain the mixture alkaline to phenolphthalein. The aqueous layer is separated and the oily layer is again washed several times with water, preferably by heating at 60° to 70° C. with water for periods of about 30 minutes for each washing. The washed oil is then distilled in steam until about 500 cc. of distillate is collected. The distillate may be washed and treated with dilute alkaline solutions for further purification if desired. The oil is then cooled to 10° to 15° C. and the solid crystalline material removed and washed with cold water in a suction filter and thereafter dried by suction and air drying.

The yield of the monoethylphthalyl ester of 2-hydroxycyclohexanone, having a melting point of 66° to 66.5° C., is about 107.4 grams, which corresponds to 74.0% of the theoretical based on the 0.5 mol of chlorocyclohexanone used. On recrystallization from 50% ethyl alcohol, the purified product had a melting point of 67° to 67.5° C.

According to the general method of preparing esters of hydroxycyclohexanones illustrated in the foregoing examples, the procedure consists essentially in reacting a chlorinated cyclohexanone or a chlorination mixture containing unreacted cyclohexanone with a sodium or potassium salt of the acid corresponding to the desired ester in the presence of the free acid, under substantially anhydrous conditions. Other alkali-metal salts of the acid may be used, if desired. Isomeric chlorocyclohexanones may be used to prepare the corresponding derivatives although the invention is specifically directed to the use of 2-chlorocyclohexanone, which is the principal product obtained on direct chlorination of cyclohexanone. Brominated or iodinated cyclohexanones may be used instead of the chlorinated derivatives, in which case the reaction is faster but not as well adapted to commercial utilization. Other conventional methods of purification may be used for recovery of the ester of the hydroxycyclohexanone as is obvious.

In my method of preparing esters of hydroxycyclohexanones I use approximately stoichiometrical quantities of the alkali-metal salt of the acid and the halogenated cyclohexanone, although an excess of about 50% or somewhat more of the alkali-metal salt of the acid may be used to drive the reaction with the halogenated chlorocyclohexanone toward completion. However, I prefer to avoid the use of free acid, as in the preparation of the ethylphthalyl ester of hydroxycyclohexanone (Example IV), or use it only in an amount corresponding stoichiometrically to approximately not more than that of the alkali-metal salt. The reaction mixture is heated at reflux temperatures for periods of one hour or longer, generally from four to thirty hours, as shown in the examples; or if large batches or somewhat less reactive substances are used, the reaction period may be even longer than this.

The esters of hydroxycyclohexanones are powerful solvents and plasticizers for cellulose esters such as cellulose nitrate and acetate. In respect to their action on cellulose nitrate they resemble camphor very closely and as plasticizers for cellulose nitrate are superlative camphor substitutes possessing properties not possessed by camphor. In general, the plasticizers are compatible with plastic substances embodying a plurality of C—O—C linkages as typified by polyvinyl acetal resins and cellulose derivatives such as cellulose esters and ethers. Plastic compositions modified by these plasticizers are illustrated in the examples which follow:

EXAMPLE 1.—*Nitrocellulose containing the acetate of 2-hydroxycyclohexanone*

Nitrocellulose was dissolved in a 50–50 mixture of butyl acetate and toluene and to portions of said solution was added the acetate of 2-hydroxycyclohexanone in varying proportions. The solution was then cast by pouring out the solution on glass plates and allowing the solvent to evaporate. The films in all cases were approximately 0.0015 inch in thickness. The results obtained by subjecting films containing various proportions of the plasticizer to tests were as given in the following table. The parts of plasticizers represent parts by weight of plasticizer per 100 parts by weight of nitrocellulose. Results with nitrocellulose films plasticized with camphor are given for comparison.

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 550 | 5 | 40 | 100 | Fair. |
| 25 | 460 | 5 | 18 | 47 | Do. |
| 50 | 394 | 7 | 17 | 55 | Do. |
| 75 | 280 | 4 | 14 | 58 | Do. |
| 25 camphor | 460 | 5 | 27 | 89 | Do. |
| 50 camphor | 380 | 6 | 22 | 84 | Do. |
| 75 camphor | 328 | 4 | 14 | 96 | Do. |
| 100 camphor | 256 | 6 | 12 | 170 | Do. |

The acetate of 2-hydroxycyclohexanone is compatible up to 100 parts in nitrocellulose but such films are tacky and soft, indicating high solvent power. The plasticizer is more permanent than camphor in nitrocellulose.

EXAMPLE 2.—*Cellulose acetate plasticized with the acetate of 2-hydroxycyclohexanone*

Cellulose acetate films plasticized with the acetate of 2-hydroxycyclohexanone were cast as in Example 1. The cellulose acetate used was Hercules PM-6 and the solvent for casting was acetone. The properties of such films and comparison with cellulose acetate films plasticized with camphor were as follows:

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 573 | 5 | 22 | 100 | Excellent. |
| 25 | 394 | 7 | 26 | 90 | Very good |
| 50 | 420 | 14 | 30 | 74 | Do. |
| 75 | 465 | 16 | 29 | 95 | Do. |
| 25 camphor | 500 | 7 | 26 | 99 | Fair. |
| 50 camphor | 395 | 16 | | 84 | Do. |
| 75 camphor | | | Incompatible | | |

The acetate of 2-hydroxycyclohexanone is compatible up to 100 parts in cellulose acetate but at such high ratio the films are tacky and soft indicating high solvent power.

EXAMPLE 3.—*Nitrocellulose plasticized with the butyrate of 2-hydroxycyclohexanone*

Cast films of nitrocellulose plasticized with the butyrate of 2-hydroxycyclohexanone were made as in Example 1. The properties of such films were as follows:

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 622 | 6 | 43 | 100 | Fair. |
| 25 | 360 | 6 | 25 | 73 | Do. |
| 50 | 290 | 7 | 19 | 73 | Do. |
| 75 | 394 | 5 | 18 | 70 | Do. |

The butyrate of 2-hydroxycyclohexanone is compatible in nitrocellulose up to 100 parts but at such high concentrations the film is soft and tacky, indicating high solvent power.

EXAMPLE 4.—*Cellulose acetate plasticized with the butyrate of 2-hydroxycyclohexanone*

Cast films of cellulose acetate plasticized with the butyrate of 2-hydroxycyclohexanone were made as in Example 2. The properties of such films were as follows:

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 663 | 5 | 30 | 100 | Excellent. |
| 25 | 635 | 30 | 28 | 97 | Do. |
| 50 | 610 | 5 | 75 | 91 | Do. |
| 75 | 465 | 10 | 49 | 79 | Do. |
| 100 | 430 | 29 | 60 | 87 | Do. |

The butyrate of 2-hydroxycyclohexanone is compatible in cellulose acetate up to 100 parts and the film is firm and non-tacky.

EXAMPLE 5.—*Nitrocellulose plasticized with the hexanoate of 2-hydroxycyclohexanone*

Cast films of nitrocellulose plasticized with the hexanoate of 2-hydroxycyclohexanone were made as in Example 1. The properties of such films, and comparison films of nitrocellulose plasticized with camphor were as follows:

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 675 | 8 | 32 | 100 | Fair. |
| 25 | 510 | 6 | 27 | 85 | Do. |
| 50 | 310 | 12 | 11 | 80 | Do. |
| 25 camphor | 510 | 8 | 20 | 89 | Do. |
| 50 camphor | 365 | 5 | 30 | 88 | Do. |
| 75 camphor | 430 | 7 | 14 | 100 | Do. |
| 100 camphor | 394 | 4 | 11 | 110 | Poor. |

The hexanoate of 2-hydroxycyclohexanone is compatible in nitrocellulose up to 75 parts but the films are soft and tacky, indicating high solvent power.

EXAMPLE 6.—*Cellulose acetate plasticized with the hexanoate of 2-hydroxycyclohexanone*

Cast films of cellulose acetate (Eastman A-13) plasticized with the hexanoate of 2-hydroxycyclohexanone were made as in Example 2. The properties of such films and comparison films of the same cellulose acetate plasticized with camphor were as follows:

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 863 | 12 | 16 | 100 | Excellent. |
| 25 | 700 | 15 | 39 | 74 | Do. |
| 50 | 430 | 26 | 49 | 78 | Do. |
| 75 | 360 | 32 | 58 | 75 | Do. |
| 100 | 365 | 41 | 108 | 54 | Do. |
| 25 camphor | 700 | 15 | 12 | 85 | Good. |
| 50 camphor | 550 | 28 | 3 | 83 | Do. |
| 75 camphor | | | Incompatible | | |

The hexanoate of 2-hydroxycyclohexanone is compatible with cellulose acetate up to 100 parts.

EXAMPLE 7.—*Nitrocellulose plasticized with the monoethylphthalate of 2-hydroxycyclohexanone*

Cast films of nitrocellulose plasticized with varying proportions of the monoethyl phthalate of 2-hydroxycyclohexanone were made as in Example 1. The properties of such films were as follows:

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 675 | 8 | 32 | 100 | Fair. |
| 25 | 520 | 6 | 10 | 58 | Do. |
| 50 | 330 | 7 | 4 | 35 | Do. |
| 75 | 152 | 6 | 7 | 52 | Do. |

In nitrocellulose more than 100 parts of the ethylphthalyl ester of 2-hydroxycyclohexanone is compatible but at such high concentrations the films are soft and tacky, indicating high solvent power.

EXAMPLE 8.—*Cellulose acetate plasticized with the monoethylphthalate of 2-hydroxycyclohexanone*

Cast films of cellulose acetate (Eastman A-13) plasticized with the monoethylphthalate of 2-hydroxycyclohexanone were made as in Example 2. The properties of such films were as follows:

| Parts plasticizer | Tensile strength | Elongation | Schopper folds | Moisture permeability | Light fastness |
|---|---|---|---|---|---|
| | $Kg./cm.^2$ | Per cent | | Per cent | |
| 0 | 863 | 12 | 16 | 100 | Excellent. |
| 25 | 640 | 11 | 19 | 58 | Do. |
| 50 | 590 | 13 | 12 | 37 | Good. |

In the particular cellulose acetate the monoethylphthalate of 2-hydroxycyclohexanone is compatible at 50 parts but incompatible at 75 parts.

EXAMPLE 9.—*Polyvinyl acetal resin plasticized with the butyrate of 2-hydroxycyclohexanone*

Into 100 parts of "Butvar," a polyvinyl acetal resin resulting from the condensation of butyraldehyde with a partially hydrolyzed polyvinyl ester, was incorporated by hot milling 50 parts by weight of the butyrate of 2-hydroxycyclohexanone. Films of approximately 0.020 inch thickness were then pressed from the plasticized composition.

The film thus obtained was transparent, showed excellent elasticity and recovery and was rubbery, possessing the property known in the rubber industry as "nerve." The film had good adhesion to glass and to Cellophane. It withstood 80 bends through an angle of 180° and return at a temperature of −20° F. before breaking. In general, rubbery properties of the sheets are pronounced when 30 to 70 parts of the plasticizer are present in 100 parts of the resin.

EXAMPLE 10.—*Polyvinyl acetal resin plasticized with the hexanoate of 2-hydroxycyclohexanone*

A film was made as in Example 9 using 50 parts by weight of the hexanoate of 2-hydroxycyclohexanone. This film had substantially the same properties as those observed in the film of Example 9 but had better adhesion to glass and Cellophane and withstood 100 bends through an angle of 180° and return at a temperature of −20° F. before breaking.

Other polyvinyl acetal resins such as condensation products of partially hydrolyzed polyvinyl esters with formaldehyde, acetaldehyde, propionaldehyde and mixtures thereof, are similarly modified in characteristics by esters of hydroxycyclohexanones.

Esters of hydroxycyclohexanones are plasticizers for cellulose derivatives such as cellulose esters and ethers and for polyvinyl acetal resins and, in general, for plastic substances embodying a plurality of C—O—C linkages. They impart a desirable combination of properties to plastics with which they are incorporated.

Esters of hydroxycyclohexanones may be used in combination with other conventional plasticizers such as camphor, dimethyl phthalate, diethyl phthalate, dibutyl phthalate, diamyl phthalate, tributyl phosphate, triphenyl phosphate, tricresyl phosphates and toluene-sulfonamide-type plasticizers to provide films of intermediate properties.

The invention has been described with reference to films of plastic compositions but the plasticizers may be used in combination with cellulose esters and ethers and polyvinyl acetal resins in liquid coating compositions and in molded and cast plastics.

Transparent films of cellulose derivatives and polyvinyl acetal resin compositions plasticized with esters of hydroxycyclohexanones are especially desirable interlayers for safety glass.

Reference is made to my co-pending divisional application, Serial Number 390,108, filed April 24, 1941, in which is claimed subject matter that is disclosed but not claimed herein.

Inasmuch as the foregoing specification comprises preferred embodiments of the invention it is to be understood that these are merely illustrative and that modifications and variations may be made therein in accordance with the principles herein set forth without departing substantially from the invention which is defined and limited only by the appended claims.

I claim:

1. A plastic composition comprising a polyvinyl acetal resin and an ester of a hydroxycyclohexanone.

2. A plastic interlayer film for safety glass formed of a plastic composition comprising a polyvinyl acetal resin and an ester of a hydroxycyclohexanone.

3. A plastic composition of matter comprising a polyvinyl acetal resin and an organic ester of 2-hydroxycyclohexanone.

4. A plastic interleaf film for safety glass formed of a plastic composition comprising a polyvinyl acetal resin and an organic ester of 2-hydroxycyclohexanone.

5. A plastic composition of matter comprising a polyvinyl acetal resin and an aliphatic ester of a hydroxycyclohexanone.

6. A plastic interleaf film for safety glass formed of a plastic composition comprising a polyvinyl acetal resin and an aliphatic ester of 2-hydroxycyclohexanone.

7. A plastic composition of matter comprising a polyvinyl acetal resin and the hexanoate of 2-hydroxycyclohexanone.

8. A plastic composition of matter comprising a polyvinyl acetal resin and the butyrate of 2-hydroxycyclohexanone.

9. A plastic composition of matter comprising a polyvinyl acetal resin and the monoalkylphthalyl ester of 2-hydroxycyclohexanone.

10. A plastic composition of matter comprising a polyvinyl acetal resin and the monoethylphthalyl ester of 2-hydroxycyclohexanone.

11. A plastic composition of matter comprising a polyvinyl butyraldehyde acetal resin plasticized with an organic ester of 2-hydroxycyclohexanone.

12. A plastic composition of matter comprising a polyvinyl formaldehyde acetal resin plasticized with an organic ester of 2-hydroxycyclohexanone.

LUCAS P. KYRIDES.